United States Patent [19]

Davis et al.

[11] Patent Number: 4,743,076
[45] Date of Patent: May 10, 1988

[54] ANTI-SKID BRAKE CONTROL SYSTEMS

[75] Inventors: John W. Davis; Robert C. Leonard, both of Coventry, England; Eamonn S. Quigley, Dublin, Ireland

[73] Assignee: Bendix Limited, Bristol, England

[21] Appl. No.: 940,205

[22] Filed: Dec. 15, 1986

Related U.S. Application Data

[63] Continuation of Ser. No. 692,191, Jan. 17, 1985, abandoned.

[30] Foreign Application Priority Data

Jan. 17, 1984 [IE] Ireland ................. 89/84

[51] Int. Cl.⁴ .................. B60T 8/00; B60T 15/08
[52] U.S. Cl. ........................ 303/119; 303/7; 303/15; 303/111; 137/627.5
[58] Field of Search .............. 303/112–119, 303/61–63, 68–69, 94–110, 7–8, 6, 111, 15, 10; 137/627.5; 60/581, 572, 561, 545; 251/129.22, 129.01, 129.15; 188/181, 16, 354, 217, 204, 345

[56] References Cited

U.S. PATENT DOCUMENTS

| | | | |
|---|---|---|---|
| 3,499,287 | 3/1970 | Schrader | 188/345 X |
| 3,520,577 | 7/1970 | Moyes | 188/345 |
| 3,640,067 | 2/1972 | Ingram | 188/345 X |
| 3,731,980 | 5/1973 | Fink et al. | 303/119 |
| 3,756,661 | 9/1973 | Michellone | 303/6 R X |
| 3,756,666 | 9/1973 | Leiber | 303/10 |
| 3,819,236 | 6/1974 | Fink et al. | 303/119 |
| 3,852,962 | 12/1974 | Warwick | 60/561 |
| 4,035,034 | 7/1977 | Sekiguchi | 303/119 X |
| 4,093,317 | 6/1978 | Lindemann et al. | 303/111 |
| 4,099,793 | 7/1978 | Iio | 303/119 X |
| 4,153,307 | 5/1979 | Goebels | 303/119 |
| 4,196,941 | 4/1980 | Goebels | 303/119 |
| 4,288,127 | 9/1981 | Leiber et al. | 303/111 |
| 4,460,220 | 7/1984 | Petersen | 303/119 |
| 4,475,773 | 10/1984 | Bartscher et al. | 303/6 A |
| 4,580,849 | 4/1986 | Farr | 303/118 |

FOREIGN PATENT DOCUMENTS 2046385 3/1983 United Kingdom .

Primary Examiner—Douglas C. Butler
Attorney, Agent, or Firm—Stevens, Davis, Miller & Mosher

[57] ABSTRACT

An anti-skid brake control system for a vehicle having a first and a second set of wheels with each wheel being provided with a brake and a brake actuator. The first set of wheels tend to lock at a lower braking pressure than the second set of wheels. Wheel speed sensors are fitted to the first set of wheels. The system includes a first and a second regulator for separately regulating the braking pressure acting on the brake actuators of the first and second set of wheels respectively. The first and second regulator co-operate to control the braking pressure acting on the first and second sets of wheels by equalizing the braking pressure.

7 Claims, 4 Drawing Sheets

ANTI-SKID BRAKE CONTROL SYSTEMS

This application is a continuation of application Ser. No. 692,191, filed Jan. 17, 1985, now abandoned.

FIELD OF THE INVENTION

This invention relates to an anti-skid brake control system for a vehicle having two sets of wheels.

RELEVANT BACKGROUND AND PRIOR ART

Known anti-skid brake control systems include means for monitoring the rotational speed of associated wheels and detecting when skidding is imminent and when it has been averted, and means for modulating the braking pressure supplied to the actuators of associated brakes for the avoidance of skidding.

The pressure modulating means is normally a pressure control mechanism having a first operational state in which it freely permits communication of pressure between the driver's control mechanism and the associated brake actuators to enable normal application and release of the brakes, and a second operational state in which it isolates the associated brake actuators from the driver's brake control mechanism and reduces braking pressure in the brake actuators for the avoidance of skidding of the associated wheels.

The wheel speed monitoring and skid detection functions are normally performed by electronic means which are arranged to change the operational state of the pressure modulating means from the first state to the second state when an incipient skid is detected and to return the pressure modulating means to its first operational state when skidding has been averted. The latter control function is essential for the maintenance of vehicle braking while the vehicle is in motion and the driver's demand for braking is sustained. Hence under braking conditions in which skidding of the associated wheels would otherwise occur the associated brakes are cyclically released (partially or wholly) and reapplied to avoid skidding and to maintain braking at or near an optimum level dictated by tyre and road surface conditions.

In systems as described, incipient skid corrective action is taken when loss of wheel speed exceeds some pre-determined criteria, such as, for example, detection of wheel deceleration exceeding a fixed threshold rate of deceleration. Detection of the subsequent state of successful skid avoidance is based upon the subsequent wheel speed rise characteristics satisfying criteria which ensure that wheel rotation is being sustained in a manner which is compatible with the changing speed of the braked vehicle.

In a vehicle, such as a multi-axle trailer, load transfer may occur between axles during braking because of the suspension mechanism of the trailer. As a result one axle is liable to lock before the other axles.

SUMMARY OF THE INVENTION

The present invention provides an anti-skid brake control system for a vehicle having a first and a second set of wheels, each wheel being provided with a brake and a brake actuator, the first set of wheels tending to lock at a lower braking pressure than the pressure at the second set of wheels, with wheel speed sensing means being fitted to the first set of wheels, the system comprising a first and a second regulating means for separately regulating the braking pressure acting on the brake actuators of the first and second set of wheels respectively; the first and second regulating means co-operating (1) to effect reduction of the braking pressure acting on the brake actuators of the vehicle in response to a signal from the wheel speed sensing means indicating an incipient skid on the first set of wheels;

(2) to increase the braking pressure acting on the brake actuators of the vehicle when the incipient signal has ceased; and (3) to alternately effect reduction of and increase the braking pressure acting on the brake actuators of the first set of wheels in response to a further signal indicating an incipient skid on the first set of wheels while effecting a gradual reduction of the braking pressure acting on the brake actuators of the second set of wheels, so as to achieve equalization of the braking pressure acting on the brake actuators of the first and second sets of wheels.

Advantageously, the increase in braking pressure acting on the brake actuators of the first set of wheels is effected in phases. Preferably, the system is arranged to control a fluid pressure operated braking system wherein the gradual reduction of the braking pressure acting on the brake actuators of the second set of wheels is achieved by enabling the flow of fluid from the brake actuators to pass through a restricted passageway.

Conveniently, the first and second regulating means includes a common pressure supply and exhaust valve, and a first and a second isolator valve each of which is associated with a corresponding set of wheels, with said restricted passageway being disposed between the outlets of the isolator valves.

Advantageously, a bleed channel is disposed between each isolator valve and the pressure supply and exhaust valve so as to permit a gradual change in braking pressure acting on the brake actuators of the vehicle.

Preferably, the pressure supply and exhaust valve and the isolator valves are of the poppet type and are provided with diaphragm seals which permit frictionless movement of the valves.

The invention also provides an anti-skid brake control system for a vehicle having a first and a second set of wheels, each wheel being provided with a brake and a brake actuator, the first set of wheels tending to lock at a lower braking pressure then the second set of wheels, with wheel speed sensing means being fitted to the first set of wheels, the system comprising a first and a second regulating means for separately regulating the braking pressure acting on the brake actuators of the first and second set of wheels respectively; the first and second regulating means co-operating to alternately effect reduction of and increase the braking pressure acting on the brake actuators of the first set of wheels in response to a signal indicating an incipient skid on the first set of wheels while effecting a gradual reduction of the braking pressure acting on the brake actuators of the second set of wheels, so as to achieve equalization of the braking pressure acting on the brake actuators of the first and second sets of wheels.

The advantage offered by equalization of the braking pressure is that the anti-skid braking system can control the braking pressure of the brake actuators on the sensed set of wheels as well as on the unsensed set of wheels.

BRIEF DESCRIPTION OF THE DRAWINGS

The invention will now be more particularly described with reference to the accompanying drawings which show, by way of example only, two embodiments of the invention.

In the drawings.

DESCRIPTION OF THE PREFERRED EMBODIMENT

Figure 1:
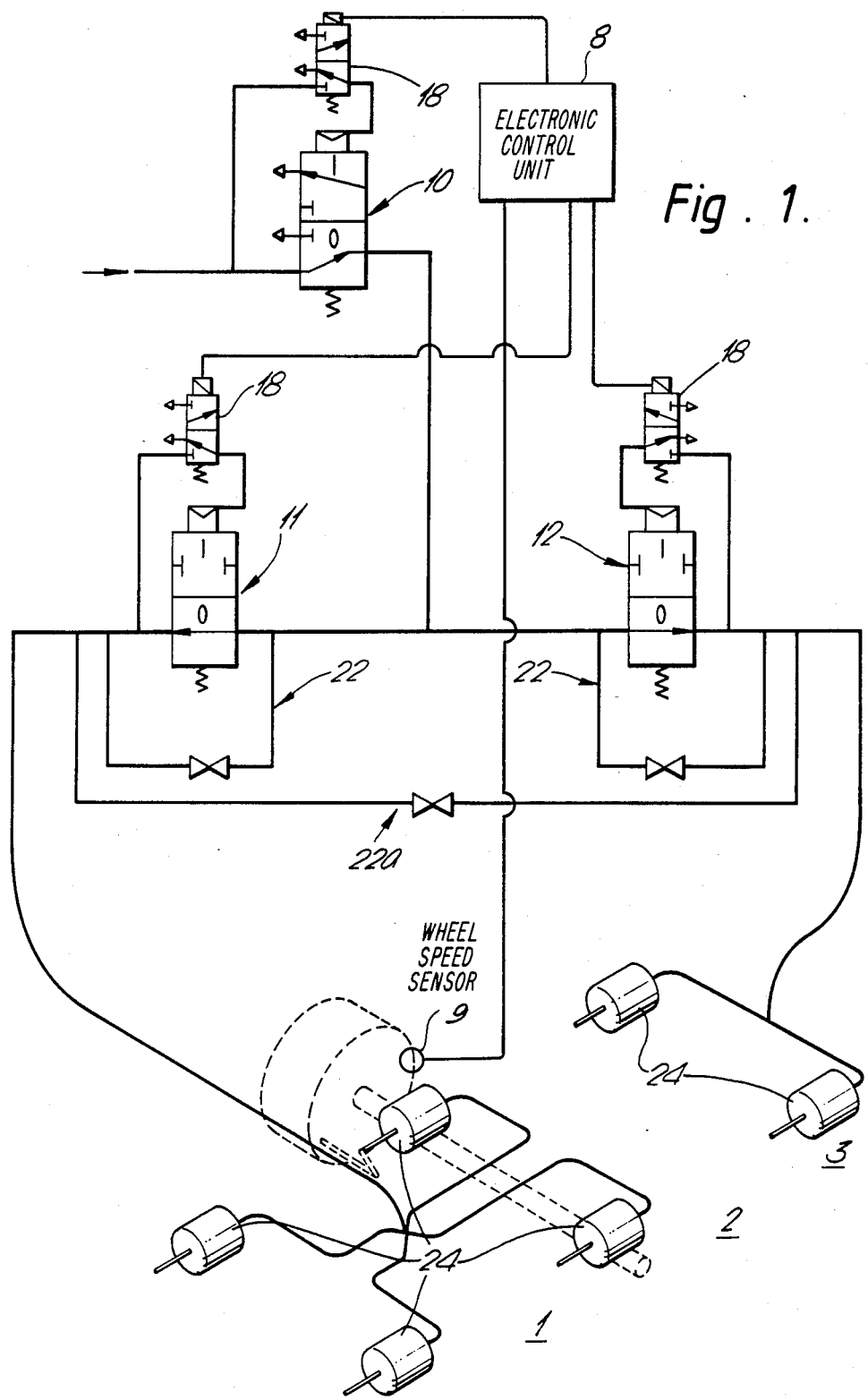
FIG. 1 is a schematic drawing showing a first embodiment of a system according to the invention connected to the braking system of a tri-axle trailer.
Figure 3:
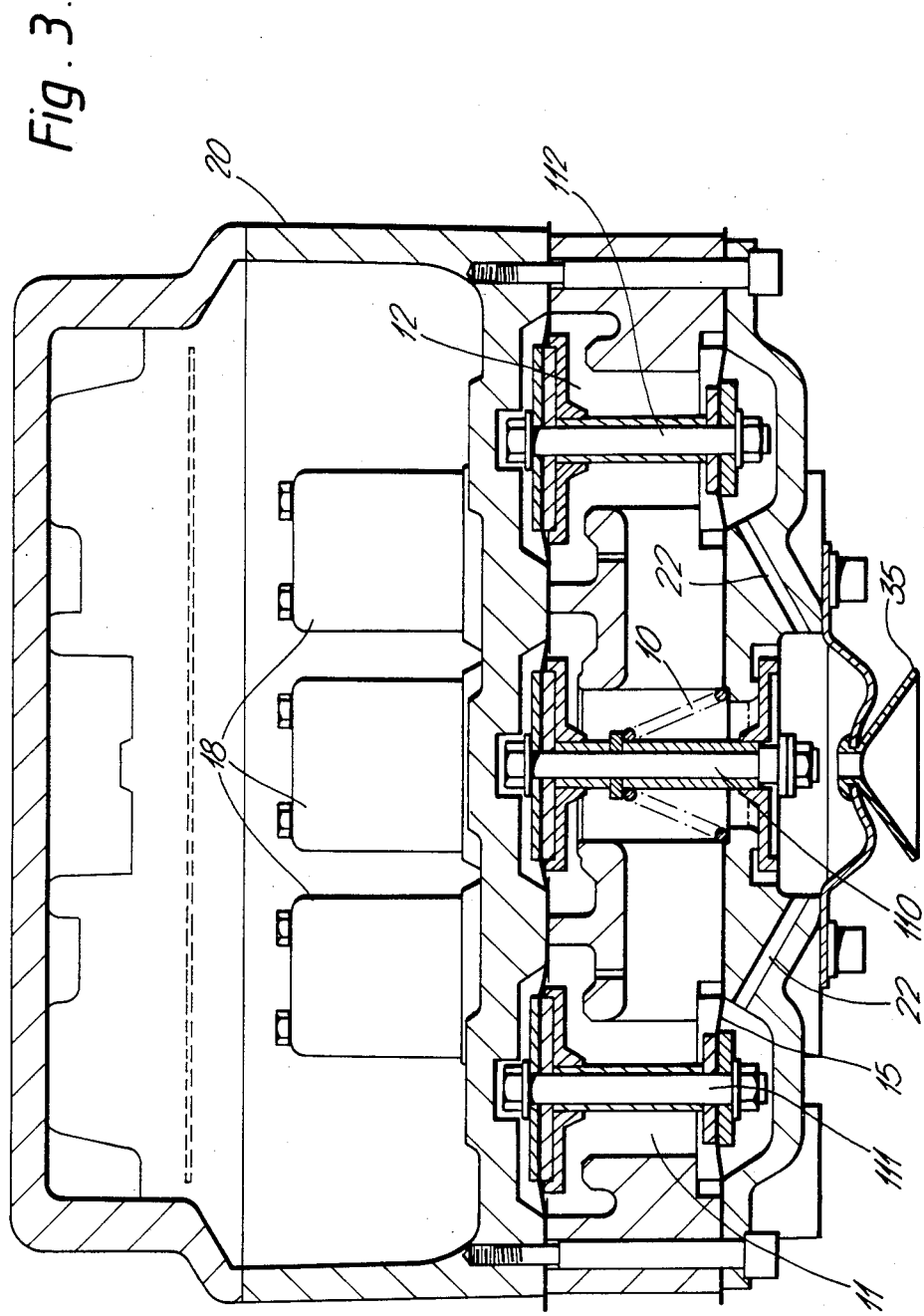
FIG. 3 is a sectional side elevation of a control unit assembly.

Referring to FIGS. 1 and 3 of the drawings, the first embodiment of the anti-skid brake control system includes three valves 10, 11 and 12. Valve 10 is a three port, two position valve which is similar to a "CR" MAXARET valve. MAXARET is a trade mark. Valves 11 and 12 are both two port, two position valves also constructed similarly to a "CR" MAXARET valve, with, however, the exhaust valve of the latter being replaced by a diaphragm seal 15 which permits frictionless movement. Each of the valves 10, 11 and 12 is operated by a solenoid pilot valve 18. The valves 10, 11 and 12 are contained within a housing 20 which also contains the solenoid pilot valves 18, and the electronic control unit 8 of the system. Each of the valves 11 and 12 is provided with a bleed channel 22 communicating with valve 10. The bleed channels 22 alter the nature of the valves 11 and 12 from being clamping valves to variable restrictor valves. The outlet ports of valves 11 and 12 are interconnected by a restricted pressure equalization passageway 22a (FIG. 1) which allows for gradual pressure equalization of the brake pressure in the respective groups of brakes actuators 24.

The arrangement shown in FIG. 1 is for a tri-axle trailer. Valve 10 is a pressure supply and exhaust selector valve. In its unenergised condition (0), it allows pressure increases and decreases as required by the vehicle driver. In its energised condition (1) the valve cuts off the pressure supply and connects the output to atmosphere (exhaust). Valves 11 and 12 are variable restrictors arranged to control connection between the output of valve 10 and brake actuators 24. As shown in FIG. 1, the brake actuators 24 associated with axles 1 and 2 are connected to the output of valve 11 and the brake actuators 24 associated with axle 3 are connected to the output of valve 12 (only axle 2 is shown in phantom lines but the position of all axles is denoted by numerals 1, 2 and 3). In a conventionally arranged tri-axle trailer, braking distribution is arranged by actuator size or leverage so that axles 1 and 2 lock at pressures which are close together, with a locking preference given to axle 2. Axle 3 usually locks at a considerably higher pressure e.g. between 1.25 and 1.35 times the locking pressure of axle 2. Wheel speed sensing is effected at axle 2 only (i.e. at the axle which is first to lock).

The electronic control unit 8 includes a microprocessor which together with the wheel speed sensors 9 monitors the wheel speed on axle 2. The electronic control unit controls the operation of solenoid pilot valves 18.

Figure 2:
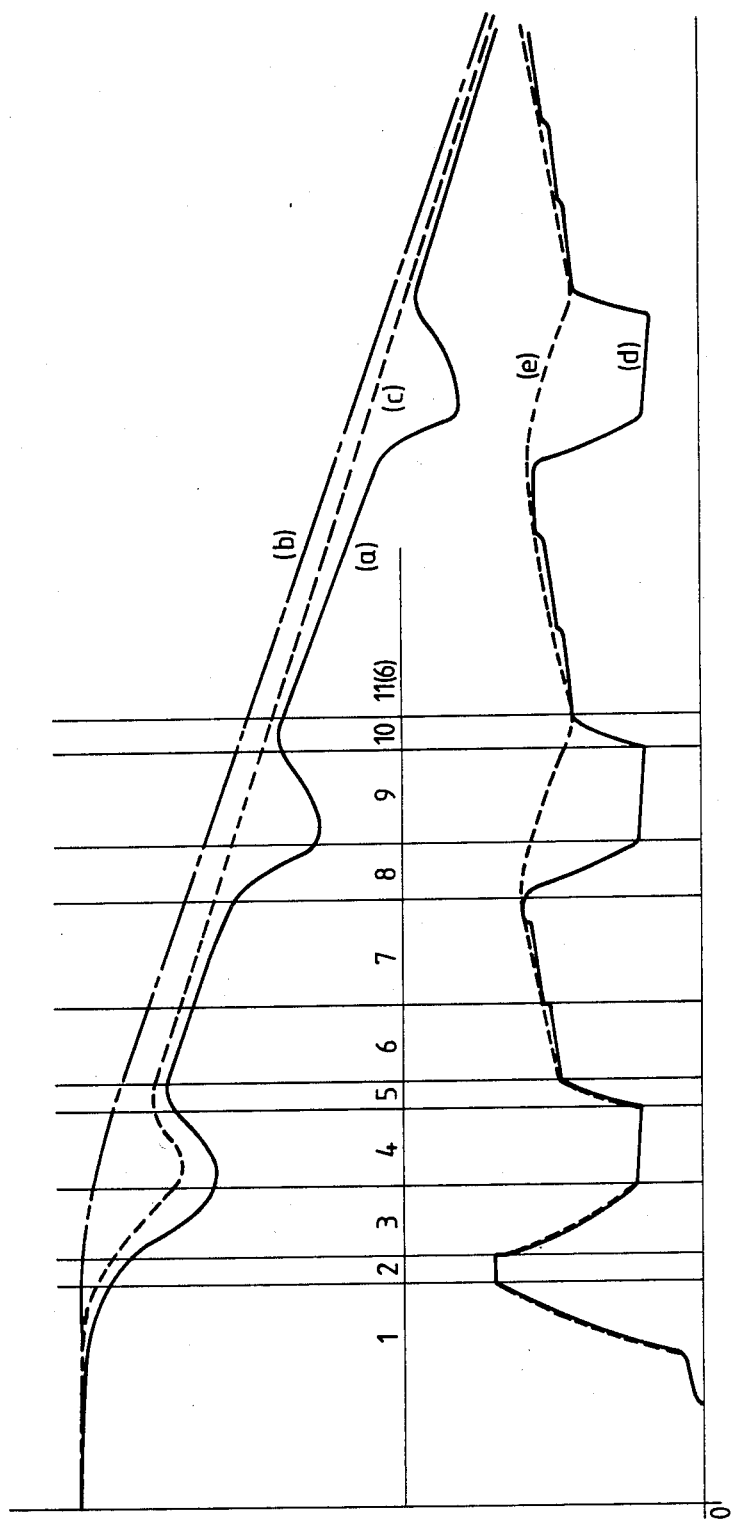
FIG. 2 shows a number of graphs which illustrate the operation of the system.

The operation of the anti-skid brake control system is best illustrated with reference to FIG. 2. The upper graph shows plots of speed against time for (a) axles 1 and 2 (b) the vehicle, and (c) axle 3 and the lower graph shows plots of actuator pressure against time for (d) axles 1 and 2, and (e) axle 3.

Phase 1 of operation of the system is the normal braking mode during which braking is entirely under driver control. During phase 1, the valves 10, 11 and 12 are unenergised, i.e. the valve condition is 10=0, 11=0 and 12=0. Towards the end of phase 1, it will be noted that the speed of axles 1 and 2 begins to decrease rapidly.

On detection of an excessive deceleration, the system switches to phase 2 which is a slow braking pressure rise state. The valve condition is 10=0, 11=1 and 12=1. Pressure is still applied to the brake actuators 24 through the bleed channels 22. If, during phase 2, wheel deceleration is not maintained then the system reverts to phase 1 and braking control is returned to driver command. In such a case, the deceleration detected during phase 1 may have been due to a combination of a reaction to bumpy surfaces and effects of the vehicle suspension.

If, however, wheel deceleration continues to deteriorate, then phase 2 is terminated and the system goes to phase 3. During phase 3, the valve 10 is operated to select exhaust and simultaneously isolate the air supply and valves 11 and 12 are opened to connect all the brake actuators 24 to exhaust. The valve condition is 10=1, 11=0 and 12=0. As a result braking pressure is reduced so as to eliminate the locking tendency.

Phase 4 is then initiated when the locking tendency disappears. Phase 4 is a slow decay of the braking pressure which is imposed to maintain braking during wheel speed recovery and to conserve energy. The valve condition is 10=1, 11=1 and 12=1. Towards the end of phase 4, valve 10 is returned to its unenergised condition on standby for a brake pressure increase, thus changing the valve condition to 10=1, 11=1 and 12=1.

Phase 4 is terminated when the microprocessor computes that wheel speed recovery is ensured and brake reapplication commences by reverting valves 11 and 12 to their unoperated condition. Phase 5 consists of applying an initial large step of pressure (e.g. approximately 50% of locking pressure) to the brake actuators 24. The valve condition during phase 5 is 10=0, 11=0 and 12=0.

Phase 6, which is a slow rise of braking pressure, terminates the quick re-application of braking pressure and avoids an immediate return to over-braking. The valve condition during phase 6 is 10=1, 11=1 and 12=1.

Phase 7 produces a stepped rise in braking pressure in which valve 11 is energised and denergised to give the equivalent of a slow pressure rise condition as a series of pressure steps, thereby giving an approach to the next incipient wheel lock which is controlled entirely between 10=0, 11=0 and 12=1, and 10=0, 11=1 and 12=1.

When an incipient wheel lock is detected on axle 2, phase 8 commences during which the actuators of axles 1 and 2 are exhausted to correct wheel locking whilst braking is maintained on axle 3 which has the least tendency to lock. The valve condition is 10=1, 11=0 and 12=0.

During phase 9, valve 11 is energised to produce a slow decay in braking pressure in axles 1 and 2 whilst valve 12 remains energised. The valve condition is 10=1, 11=1 and 12=1.

During phase 10, the valve condition changes to 10=0, 11=0 and 12=1 to reapply braking pressure to valve 11. Valves 12 remains on a slow decay until the braking pressure in axle 3 equalizes with the braking pressure in axles 1 and 2.

When pressure equalization occurs, the system enters phase 11 during which another cycle of anti-lock operation commences and the system repeats phases 6 to 10 inclusive.

The system continues with this control valve sequence for the duration of the stop or until brake application or surface conditions change so that anti-skid brake control is not required.

Pressure equalization is achieved due to the presence of the passageway 22a, which connects the outlets feeding the front axles (axles 1 and 2) to that feeding the rear axle (axle 3). The bleed channels 22 are used to give a slow raising and lowering of pressure. In a typical example, the variation of pressure would be 20 psi/sec as compared to 200 psi/sec on full flow.

As explained, the presence of the bleed feature enables pressure to be gradually equalised between front and rear axles during a clamp on all axles, i.e. when valves 11 and 12 are energised. The bleed feature also means that the pressure at axle 3 will fall slowly during a clamp of pressure on axles 1 and 2 and also that the pressure at axle 3 will rise slowly during a brake application on axles 1 and 2 only.

As shown in FIG. 3, the valves 10, 11 and 12 are shown in the open position. The air inlet to the housing 20 is laterally into the plane of the drawing. The valves 10, 11 and 12 have spindles 110, 111 and 112 which are moved downwardly to close the valves. When the valve 10 is energised air exits through exhaust port 35.

Figure 4:
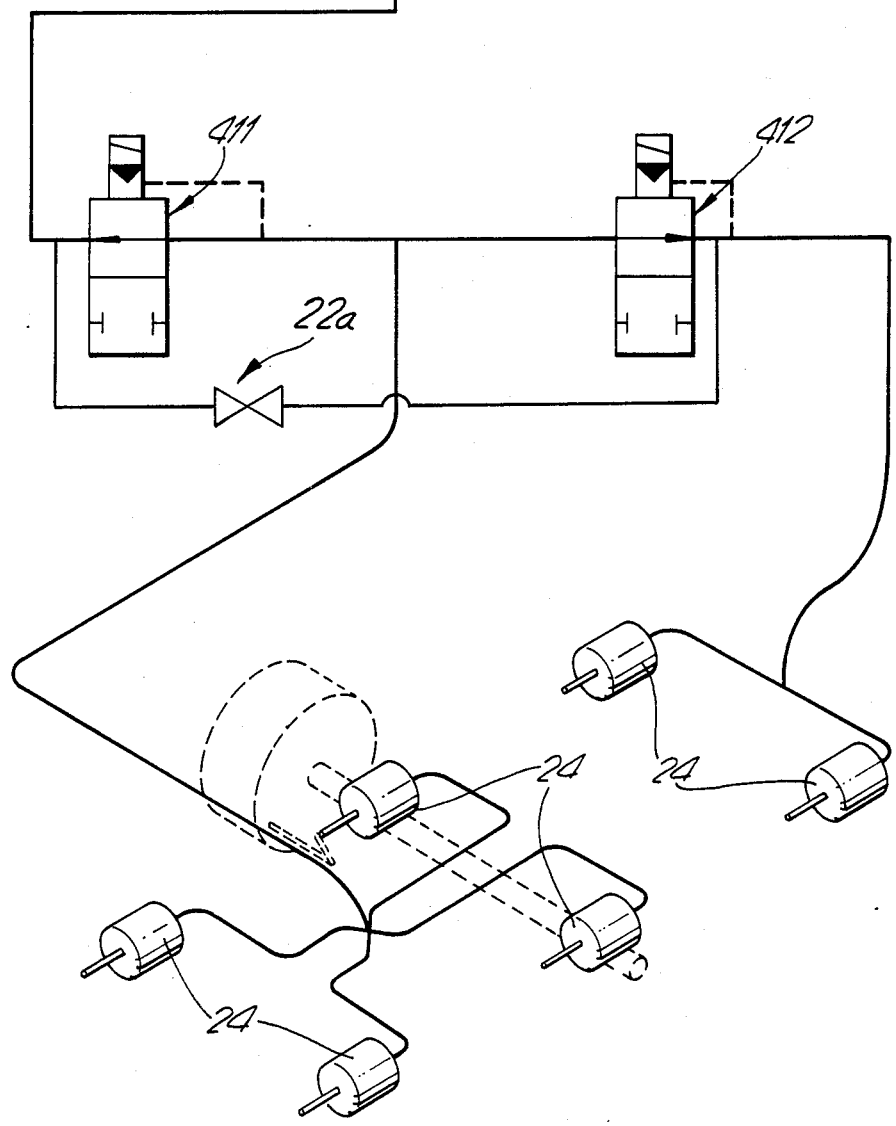
FIG. 4 is a schematic drawing showing a second embodiment of a system according to the invention connected to the braking system of a tri-axle trailer.

A second embodiment of anti-skid braking valve is shown in FIG. 4. The arrangement shown in this Figure enables the rapid equalization of pressure in all axles by de-energising valve 412 while energising valve 411. The second embodiment requires slightly larger sizing of valve 411. This embodiment illustrates that isolator valve 412 is connected to brake pressure supply 10 through isolator valve 411 rather than directly as set forth in FIG. 1.

We claim:

1. An anti-skid brake control apparatus for a vehicle, said vehicle including first and second wheel bearing axles, each wheel on each of said axles being provided with a brake and a brake actuator as part of the braking system of said vehicle, wheel speed sensing means fitted on said first axle, the wheels of said first axle having a tendency to lock at a lower braking pressure than the wheels of the second axle, and electronic control means for monitoring signals produced by said wheel speed sensing means and for controlling the anti-skid brake control apparatus in response to said signals, said brake control apparatus comprising:
   a brake fluid pressure supply and exhaust valve;
   a first isolator valve means for interrupting brake fluid communication between said pressure supply and exhaust valve and the brake actuators of the first axle;
   a second isolator valve means for interrupting brake fluid communication between said pressure supply and exhaust valve and the brake actuators of the second axle;
   each of said isolator valve means having an inlet and an outlet, said inlets being connected to the brake fluid pressure supply and exhaust valve and said outlets having means for connection to the braking system of the vehicle;
   said second isolator valve means, responsive to said electronic control means, for maintaining brake fluid pressure acting on the brake actuators of the second axle, independently of the brake fluid pressure acting on the brake actuators of the first axle, after the detection by the electronic control means of an incipient skid signal from said wheel speed sensing means; and
   a restricted passageway means, provided between the first and second isolator valve means, for equalizing brake fluid pressure acting on the brake actuators of the first and second axles after the detection by the electronic control means of a wheel speed recovery signal from the wheel speed sensing means.

2. An anti-skid brake control apparatus as claimed in claim 1, in which the restricted passageway means is provided across the outlets of the first and second isolator valve means.

3. An anti-skid brake control apparatus as claimed in claim 1, in which a bleed channel is provided between each isolator valve means output and the brake fluid pressure supply and exhaust valve output so as to permit a gradual change in brake fluid pressure acting on the brake actuators of the first and second axles.

4. An anti-skid brake control apparatus as claimed in claim 1, in which the pressure supply and exhaust valve and the isolator valve means are a poppet type valve and are provided with diaphragm seals which permit frictionless movement.

5. The anti-skid brake control apparatus according to claim 1 wherein one of said isolator valve means is connected to said brake fluid pressure supply and exhaust valve through the other of said isolator valve means.

6. An anti-skid brake control valve assembly for use with a pair of brake actuators, said control valve assembly comprising:
   a brake fluid pressure supply and exhaust valve having an inlet and an outlet;
   a pair of isolator valves, each isolator valve having an inlet connected to said outlet of said brake fluid pressure supply and exhaust valve, and each isolator valve having at least one outlet connected to a respective brake actuator, for controllably applying brake fluid under pressure to said brake actuator when said isolator valve is open and for isolating said isolator valve output from said isolator valve input when said isolator valve is closed; and
   means defining an open restricted passageway between said outlets of said isolator valves for continuous restricted communication between said outlets, said continuous restricted communication comprising a gradual equalization of the braking pressure acting on said brake actuators when at least one of said isolator valves is closed.

7. The anti-skid brake control valve assembly as claimed in claim 6, further including means defining a bleed channel between the outlet of said brake fluid pressure supply and exhaust valve and the outlet of each of said isolator valves, for allowing brake fluid communication between said pressure supply and exhaust valve and a corresponding brake actuator at a reduced rate when said corresponding isolator valve is closed.

* * * * *